Patented Nov. 22, 1938

2,137,568

UNITED STATES PATENT OFFICE 2,137,568

PHENOLIC MOLDING POWDER

Ludwig Cserny, Wiesbaden Hessen-Nassau, Germany, assignor to The Resinous Products & Chemical Company, Philadelphia, Pa.

No Drawing. Application May 20, 1936, Serial No. 80,716. In Germany May 22, 1935

8 Claims. (Cl. 106—22)

This invention relates to the preparation of phenol-aldehyde molding powders and in particular to such powders which yield transparent articles and which are so prepared that the pieces or particles of the powder do not fuse completely during the molding operation thus causing them to flux together but instead are only sufficiently fusible that on heating under pressure the pieces are only superficially but firmly welded to adjacent pieces resulting in a strong, clear, coherent article.

In my co-pending applications 1,171, filed January 10, 1935, and 28,022, filed June 22, 1935, of which the present application is a continuation-in-part, it is shown that the addition of certain organic materials to phenol-aldehyde condensation products permits them to be prehardened to a point at which they can be sliced by means of a knife at ordinary temperatures. Such materials when sliced and pressed in a mold can be welded together without any appreciable flow taking place. However, if these materials are reduced to a powder, they cannot be satisfactorily molded under heat and pressure because of lack of sufficient flow in the material.

Attempts have been made to weld pure, slightly pre-hardened phenol-aldehyde condensation products in a similar manner but these have failed on account of the ease with which such materials flow under the influence of heat and pressure. It thus has been impossible up to the present to prepare a molding powder of the correct degree of prehardening to permit the particles to weld firmly together without completely fusing so that by using variously colored particles unique effects could be obtained.

The molding powders containing fillers which are generally available are made by preparing first a non-reactive resin by condensing a phenol with less than one mol of formaldehyde, subsequently adding a hardening material such as hexamethyltetramine. When this material is reduced to a powder and heated in a mold, the hexamethyltetramine converts the inactive resin to an active one so that it can be hardened to the final or "C" stage. The present invention contemplates preparing an active phenolaldehyde resin by condensing one mol of a phenol with more than one mol of formaldehyde and, by suitably plasticizing this resin and hardening it to a definite stage, a powder may be produced from it which on subsequent heating under pressure will be a transparent molded article.

It is an object of this invention to provide a molding powder of this type which will yield transparent articles. It is a further object to provide such a powder in that state of prehardening which will permit the particles to adhere firmly to each other, without completely fluxing together, under the action of heat and pressure. It is another object to provide a phenolic molding powder which can be prepared in various colors so that on mixing powders of different colors articles can be molded so that the colors do not run together but yield results similar to the irregular color distribution in certain natural products such as tortoise shell, amber, etc. For this purpose a rather coarse powder will yield the best results.

These objects have been accomplished in the following manner:

A reactive phenol-aldehyde condensation product is prepared from one mol of phenol and approximately two or more mols of formaldehyde. During the preparation one or more of the organic plasticizing agents enumerated in the copending applications designated above is added to the reaction mixture. The condensation is carried out in an alkaline medium to a point beyond the so-called "B" stage so that the resulting material is insoluble and practically infusible. It does, however, retain a slight degree of plasticity. In this condition it has two characteristic properties that render it unique as a molding powder, particularly one containing no opaque fillers and which therefore may be used in the production of transparent molded articles. First, it can be readily ground to powder and, second, it has been just sufficient residual plasticity to permit the particles to be welded together under the action of heat and pressure with only a minimum of flow taking place in the individual particle. In molding such powders any movement of the powder taking place in the mold is one in which the particles move as units but are not completely fused to a liquid so that they run together. The uniting of these particles to a unitary mass is due to a superficial welding of the particles. The powder thus obtained does not require the addition of any hardening agent as is the case with the usual type of phenol-formaldehyde molding resin heretofore available.

In the molding operation this powder has the advantage that it is not necessary to leave the article in the mold until final hardening has been completed. It is necessary to leave it in the mold only long enough to form it and insure the thorough welding of all the particles after which it may be removed and further heated to complete the hardening. After removal from the mold the article is rigid enough to withstand the subsequent heating required to harden it without deformation.

The plasticizing agents which may be used in the preparation of these phenolic molding powders include the following: condensation products of acid amids and aldehydes, particularly urea or thiourea and formaldehyde, the condensation products of aliphatic or aromatic amines with aldehydes, the polymerization product of unsaturated compounds such as styrene, the vinyl compounds, etc., soluble phenol-aldehyde condensation products of the Novolak type, alkyd resins, and cellulose derivatives such as cellulose nitrate, cellulose acetate, benzyl cellulose, etc. These may be added to the phenol-aldehyde condensation product before or during the preliminary hardening. In the case of the condensation products of aldehydes with urea or amines, the urea or the amine may be added to the mixture of formaldehyde and phenol containing sufficient aldehyde to completely react with both phenol and urea thus forming a very intimate mixture of the two types of condensation product. The products thus obtained are then hardened to a point between the "B" and "C" stages at which they can be ground to a powder and in this state are fusible.

The following examples will illustrate this invention but it is not limited to the exact conditions of time, temperature and proportion of ingredients shown since it may be otherwise practiced within the scope of the appended claims.

Example 1

75 parts of a phenol-formaldehyde condensation product, prepared from 1.0 mol of phenol and 2.5 mols of formaldehyde in the presence of strong alkali, are mixed with 25 parts of a soluble, fusible phenol-aldehyde condensation product of the Novolak type, heated to about 60° C. until the product passes the "B" stage, becomes insoluble and is sufficiently hard to be ground. After grinding to a powder it may be molded at a temperature of about 80° C. under a pressure of about 70 atmospheres. Under these conditions there is practically no flow of material in the mold and the individual particles are simply welded together. Such a product may be colored as desired and a mixture of powders of different colors placed in a mold. When such a mixture of powders is pressed, the individual particles will weld together without fluxing into each other and in this manner unique effects in the finished article can be obtained.

Example 2

75 parts of an alkaline condensation product, prepared from 1.0 mol of phenol and 2.5 mols of formaldehyde, are mixed with a glyceryl phthalate having an acid number of about 140. This mixture is then heated at about 60° C. until condensed beyond the "B" stage and is hard enough to be ground to a powder. It may then be molded as shown in Example 1.

Example 3

2 gram mols of urea, 4 gram mols of formaldehyde (30%) and 10 cc. of caustic soda (N/1) are condensed for 10 minutes under a reflux condenser after which 1.0 gram mol of phenol is added and the boiling continued for about 30 minutes longer. 14 cc. of hydrochloric acid (N/1) is then added and the solution boiled 75 minutes following which the water is distilled off under reduced pressure at 40°–50° C. The resulting product is a semi-crystalline, white substance having a sinter point of approximately 70° C. On prolonged distillation at a somewhat increased temperature the product loses its ability to sinter and passes beyond the "B" stage. It may then be powdered. The powder thus obtained may be molded at a temperature of about 80° C. under a pressure of about 60 atmospheres. This product may also be colored in various ways as described in Example 1.

Example 4

100 parts of phenol, 100 parts of 40% formaldehyde and 10 parts of cellulose acetate are heated together under a reflux condenser until the cellulose acetate is dissolved. 2 parts of ammonia (0.91 sp. g.) is then added and the mixture heated until it becomes cloudy. This mixture is then dehydrated under reduced pressure and heated at about 60° C. until the condensation product has passed the "B" stage and the resulting material is hard enough to be ground. The powder thus obtained may be molded as shown in the previous examples. This product may also be dyed in various colors and mixtures of powders made in order to obtain any desired color effect in the final product.

The powders made according to the foregoing examples may be used for various purposes in the molding industry, particularly where color effects such as those obtained in natural products like amber, tortoise shell, etc. are desired.

I claim:

1. A process for preparing infusible, weldable molding powders which comprises partially condensing a phenol with more than an equimolecular proportion of formaldehyde in an alkaline medium, adding to the partial condensate a modifying agent which is one of the group consisting of amid-formaldehyde condensation products and of condensation products of a polybasic acid with a polyhydric alcohol, and continuing the condensation until the composite product has reached a point, intermediate the B and C stages, at which ground particles of said composite product are infusible but have sufficient residual elasticity to permit their being welded together with a minimum of fluxing into a transparent unitary mass by the application of heat and pressure.

2. The process for preparing infusible, weldable, molding powders which comprises condensing a phenol with more than an equimolecular proportion of formaldehyde in an alkaline medium in the presence of a modifying agent which is one of the group consisting of amid-formaldehyde condensation products and condensation products of a polybasic acid with a polyhydric alcohol, and stopping the condensation when the composite product has reached a point, intermediate the B and C stages, at which ground particles of said composite product are infusible but have sufficient residual elasticity to permit their being welded together with a minimum of fluxing into a transparent unitary mass by the application of heat and pressure.

3. The process for preparing infusible, weldable, molding powders which comprises condensing a phenol with more than an equimolecular proportion of formaldehyde in an alkaline medium in the presence of an amid-formaldehyde condensation product and stopping the condensation when the composite product has reached a point, intermediate the B and C stages, at which ground particles of said composite product are infusible but have sufficient residual elasticity to permit their being welded together with a minimum of fluxing into a transparent unitary mass by the application of heat and pressure.

4. The process for preparing infusible, weldable, molding powders which comprises partially condensing a phenol with more than an equimolecular proportion of formaldehyde in an alkaline medium, adding to the partial condensate a condensation product of glycerine and phthalic acid, and continuing the condensation until the composite product has reached a point, intermediate the B and C stages, at which ground particles of said composite product are infusible but have sufficient residual elasticity to permit their being welded together with a minimum of fluxing into a transparent unitary mass by the application of heat and pressure.

5. The process for preparing infusible, weldable molding powders which comprises condensing a phenol-formaldehyde reaction product in an alkaline medium and in the presence of a modifying agent which is one of the group consisting of amide-formaldehyde condensation products and condensation products of a polybasic acid with a polyhydric alcohol, and stopping the condensation when the composite product has reached a point, intermediate the B and C stages, at which ground particles of said composite product are infusible but have sufficient residual elasticity to permit their being welded together with a minimum of fluxing into a transparent unitary mass by the application of heat and pressure.

6. An infusible, weldable molding powder prepared by the process of claim 5.

7. An infusible, weldable molding powder prepared by the process of claim 3.

8. An infusible, weldable molding powder prepared by the process of claim 4.

LUDWIG CSERNY.